United States Patent [19]

Lyu

[11] Patent Number: 5,416,643
[45] Date of Patent: May 16, 1995

[54] VIDEO SIGNAL RECORDING AND REPRODUCING APPARATUS USING DEPTH SEPARATED RECORDING BANDS

[75] Inventor: Jae-Cheon Lyu, Seoul, Rep. of Korea

[73] Assignee: Samsung Electronics Co., Ltd., Kyungki-do, Rep. of Korea

[21] Appl. No.: 38,803

[22] Filed: Mar. 29, 1993

[30] Foreign Application Priority Data

Mar. 27, 1992 [KR] Rep. of Korea .................. 92-5116

[51] Int. Cl.⁶ .......................... G11B 5/09; H04N 5/79
[52] U.S. Cl. ........................................ 360/32; 358/330
[58] Field of Search ........................ 360/8, 9.1, 22, 32, 360/46, 65; 358/320, 330, 335

[56] References Cited

U.S. PATENT DOCUMENTS

| | | | |
|---|---|---|---|
| 4,607,293 | 8/1986 | Okada et al. | 358/328 |
| 4,679,097 | 7/1987 | Tomita | 358/330 |
| 5,063,453 | 11/1991 | Yoshimura et al. | 360/32 |
| 5,189,564 | 2/1993 | Amada et al. | 360/32 |
| 5,223,943 | 6/1993 | Imura | 358/330 |

FOREIGN PATENT DOCUMENTS 63-234692 9/1988 Japan.

Primary Examiner—A. Psitos
Assistant Examiner—Won Tae C. Kim
Attorney, Agent, or Firm—Sughrue, Mion, Zinn, Macpeak & Seas

[57] ABSTRACT

A video signal recording apparatus has a high band signal recording circuit for deeply recording onto a recording medium a high band component of a video signal separated from a composite video signal and a low band signal recording circuit for recording on a recording medium a low band component of a signal separated from the composite video signal using a much shallower recording depth.

2 Claims, 4 Drawing Sheets

VIDEO SIGNAL RECORDING AND REPRODUCING APPARATUS USING DEPTH SEPARATED RECORDING BANDS

FIELD OF THE INVENTION

The present invention relates to an apparatus which can record and reproduce a video signal, and more particularly to a video signal recording and reproducing apparatus which can improve signal resolution by deeply recording a luminance signal on a high frequency band to thereby reproduce the same. The present disclosure is based upon the disclosure of Korean Patent Application No. 92-5116 filed Mar. 27, 1992, which disclosure is incorporated herein by reference.

BACKGROUND OF THE INVENTION

A camcorder is a conventional video signal recording and reproducing apparatus with an integrated video cassette recorder and video camera.

This kind of video signal recording and reproducing apparatus, however, has a drawback in that it cannot record and reproduce a high frequency band signal due to limitations in the physical characteristics of the recording medium and the video head (or magnetic head).

Specifically, because the quality of the material making up the recording medium used with the conventional video cassette recorder is not high enough to record and reproduce a signal of a high frequency band and because a gap of a video head is not narrow enough to record and reproduce a high frequency band, a self induction operation enabling the recording and reproducing of a high frequency band signal is impossible.

In order to overcome the drawback, a technique has been developed to record and reproduce a high frequency band signal, wherein, in a video signal recording and reproducing apparatus for processing a video signal bandwidth of approx. 5 MHZ, 2.5 MHZ is set as a reference frequency, and a frequency band of 0–2.5 MHZ is set as a low frequency band and a frequency band of 2.5 MHZ–5 MHZ is set up as a high frequency band. The low frequency band signal is then folded over the high frequency band signal for recording and the low frequency band signal can be unfolded over the high frequency band signal for reproducing.

However, there arises a problem with this technique in that severe crosstalk occurs in an area where the signals are folded due to an overlap between the low frequency band and high frequency band.

Likewise, it is possible to improve the quality of the material making up the recording medium and to vary the recording/reproducing head gap. However, this has made the product quite expensive to produce.

SUMMARY OF THE INVENTION

Accordingly, it is an object of the present invention to provide a video signal recording and reproducing apparatus which can improve signal resolution by deeply recording a high band component of the luminance signal which has been separated from a composite video signal onto a recording medium to thereafter reproduce the same.

In accordance with one aspect of the present invention, there is provided a video signal recording apparatus which has:

a high band signal recording circuit for deeply recording a high band component signal separated from a composite video signal onto a recording medium using a first depth value; and a low band signal recording circuit for recording a low band component signal separated from the composite video signal onto the recording medium using a second depth value which is much shallower than the first depth value.

In accordance with another aspect of the present invention, there is provided a video signal reproducing apparatus, which has:

a high band signal reproducing circuit for reproducing a high band component signal deeply recorded onto a recording medium using a first depth value; and a low band signal reproducing circuit for reproducing a low band component signal recorded on a recording medium using a second depth value less than (shallower than) said first depth value.

BRIEF DESCRIPTION OF THE DRAWINGS

For providing a fuller understanding of the nature and objects of the invention, reference should be made to the following detailed description taken in conjunction with the accompanying drawings in which.

DETAILED DESCRIPTION OF THE PREFERRED EMBODIMENTS

The present invention of a video signal recording and reproducing apparatus will now be described in connection with the preferred embodiments thereof with reference to the accompanying drawings.

Figure 1:
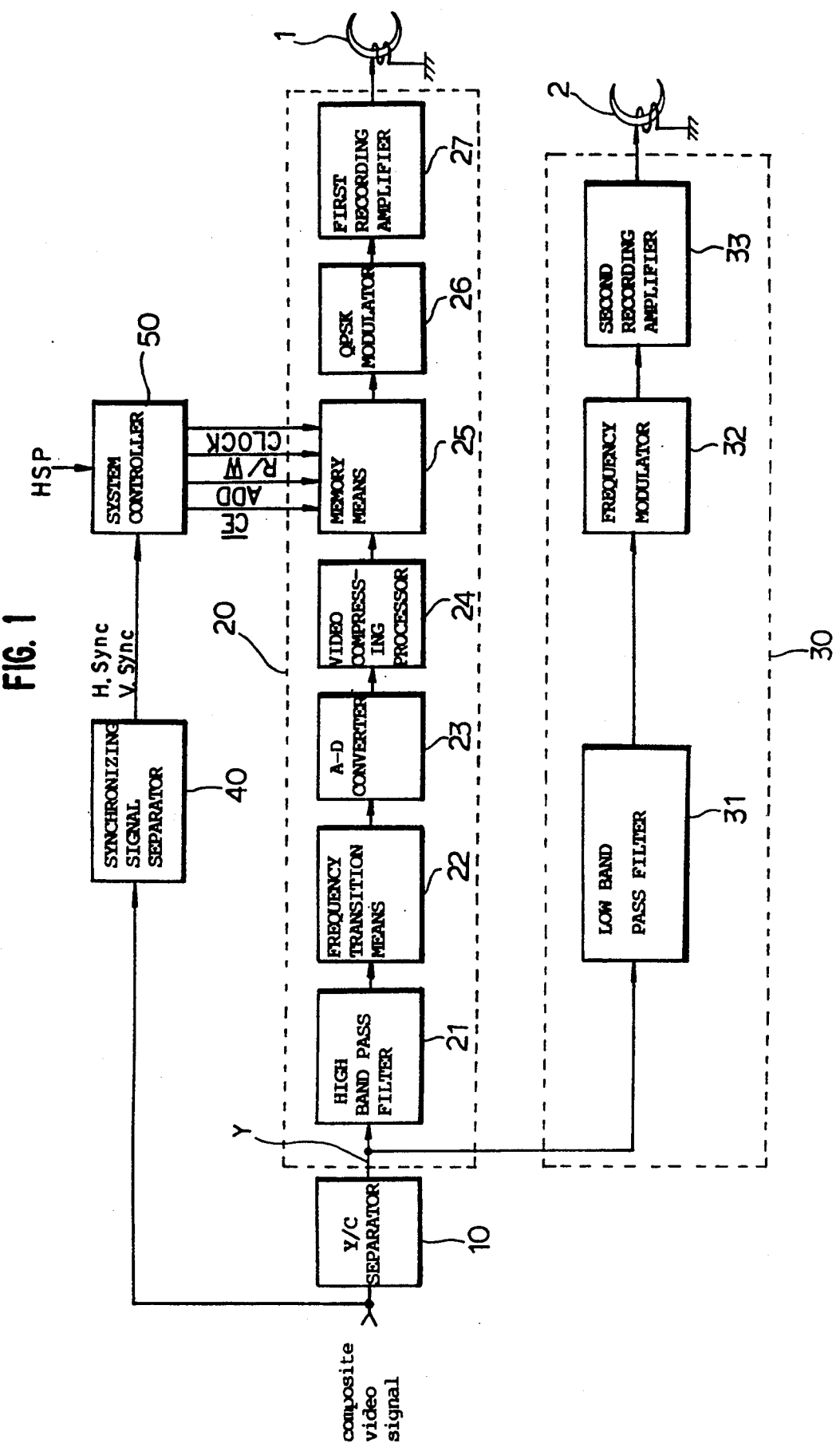
FIG. 1 is a block diagram of a video signal recording apparatus in accordance with the present invention.

FIG. 1 is a block diagram of a video signal recording apparatus in accordance with the present invention, comprising a high band signal recording circuit 20 for deeply recording a high band component signal separated from a composite video signal onto a recording medium using a first depth value and a low band signal recording circuit 30 for recording a low band component signal separated from the composite video signal using a second depth value less than (shallower than) said first value.

In FIG. 1, a luminance/chrominance signal separator 10 separates the luminance signal from the composite video signal. A high pass filter 21 of the high band signal recording circuit 20 passes the high band component among the luminance signals outputted from the luminance/chrominance signal separator 10. A frequency translation circuit 22 translates the high band component signal outputted from the high pass filter 21 to the low frequency band. An Analog-to-Digital Converter (ADC) 23 of the high band signal recording circuit 20 converts a signal outputted from the frequency translation circuit 22 to a digital signal. A video compressing processor 24 compresses the output from the ADC 23. A memory 25 stores the luminance signal data compressed in the video compressing processor 24.

A Quadurature Phase Shift Keying (QPSK) modulator 26 uses quadurature phase shift keying to modulate the luminance signal data read out of memory 25 under the control of a system controller 50. A recording amplifier 27 amplifies the modulated luminance signal data outputted from the QPSK modulator 26. A first head 1 deeply records the luminance signal data outputted from the recording amplifier 27 onto a recording medium.

Meanwhile, a synchronizing signal separator 40 separates vertical and horizontal synchronizing signals from the composite video signal and provides them to the system controller 50.

The system controller 50 processes the vertical and horizontal synchronizing signals outputted from the synchronizing signal separator 40 and sends control signals to the memory 25 of the high band signal recording circuit 20 according to a head switching pulse HSP. The control signals include $\overline{CE}$, ADDRESS, $R/\overline{W}$ and CLOCK signals. The HSP therefore initializes and controls the read/write operation of the memory 25.

A low pass filter 31 of the low band signal recording circuit 30 passes a low band component of the luminance signal outputted from the luminance/chrominance signal separator 10. A Frequency Modulator 32 frequency modulates the output of the low pass filter 31.

A second head 2 records the luminance signal of low band component outputted from the frequency modulator 32 onto a surface of the recording medium after being amplified by a second recording amplifier 33.

Figure 2:
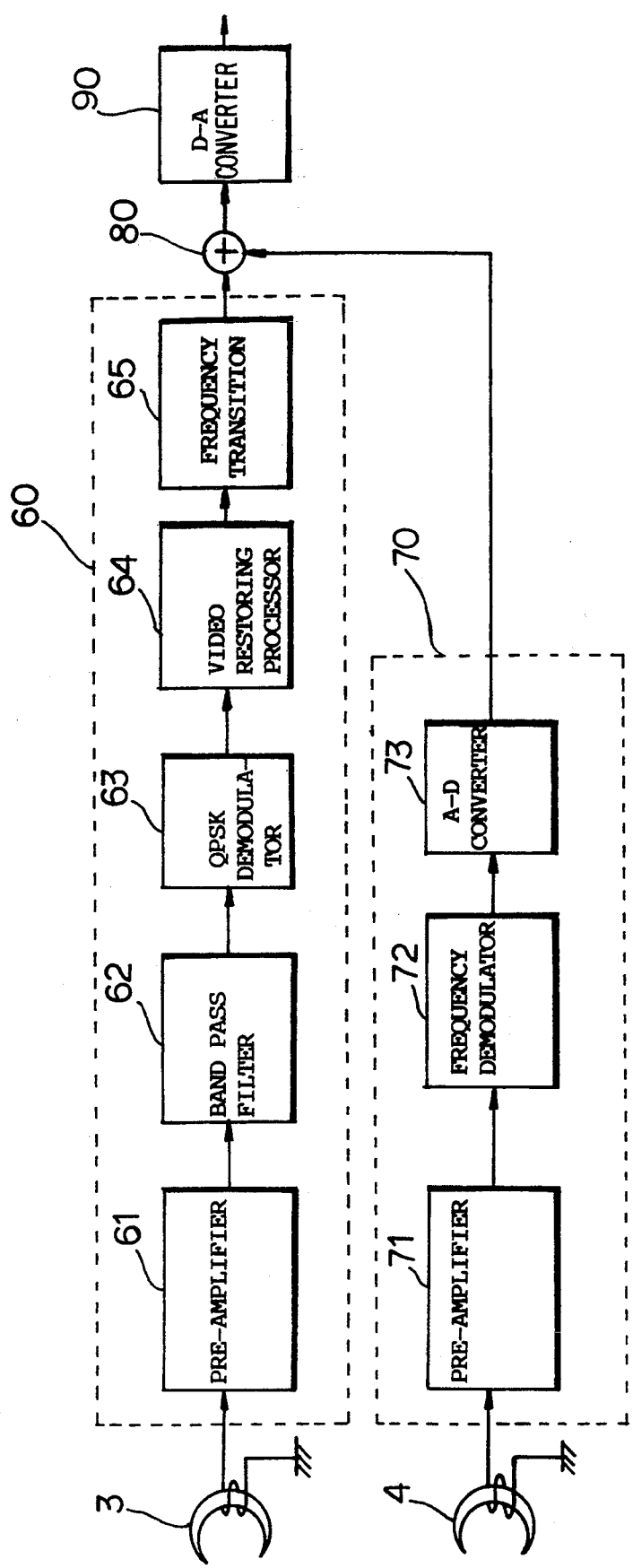
FIG. 2 is a block diagram of a video signal reproducing apparatus in accordance with the present invention.

FIG. 2 is a block diagram of a video signal reproducing apparatus in accordance with the present invention. A high band signal reproducing circuit 60 is for reproducing a high band component signal deeply recorded onto the recording medium and a low band signal reproducing circuit 70 is for reproducing a low band component signal recorded onto the recording medium with a shallower depth.

In FIG. 2, a third head 3 reproduces the luminance signal of a high frequency band which has been deeply recorded on the recording medium. A pre-amplifier 61 of the high band signal reproducing circuit 60 amplifies the output of the third head 3 to a predetermined value. A band pass filter 62 passes only a predetermined frequency band among the signals amplified by the pre-amplifier 61 to thereby remove noise. A QPSK demodulator 63 demodulates, using QPSK demodulation, a signal outputted from the band pass filter 62. A video restoring processor 64 restores a signal outputted and compressed at the QPSK demodulator 63 to a signal prior to the compression. A frequency translation circuit 65 translates to the original frequency band a signal outputted from the video restoring processor 64.

A fourth head 4 reproduces the low frequency band luminance signal recorded onto the recording medium using a shallower depth than the high frequency band luminance signal.

A pre-amplifier 71 of the low band signal reproducing circuit 70 amplifies to a predetermined value a signal reproduced by the fourth head 4. A frequency demodulator 72 frequency demodulates a signal amplified by the pre-amplifier 71. An ADC 73 converts a signal output from the frequency demodulator 72 to a digital signal.

Meanwhile, a mixer 80 mixes the low band and high band luminance signals reproduced from the high band signal reproducing circuit 60 and low band signal reproducing circuit 70.

A Digital-to-Analog Converter (DAC) 90 converts the luminance signal of the combined high and low bands outputted from the mixer 80 to a analog signal to thereafter output the same.

Operations of the preferred embodiments will now be described.

Here, the preferred embodiment applied to a video cassette recorder having a frequency band of video signal ranging around 0–5 MHZ will be explained.

Figure 3A:
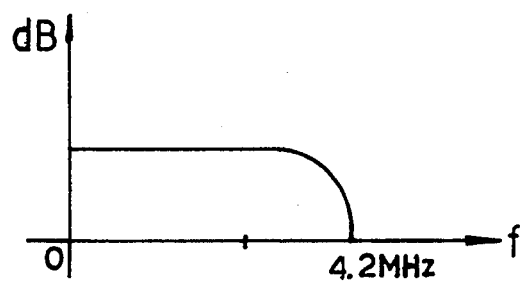
FIGS. 3A, 3B and 3C are characteristic diagrams of a luminance signal illustrated in FIG. 1.

First, the luminance/chrominance separator 10 in FIG. 1 separates a luminance signal as illustrated in FIG. 3A from the incoming composite video signals to thereafter output the same.

An explanation about chrominance signal separated from the luminance/chrominance signal separator 10 will be omitted as it is well-known.

Figure 3B:
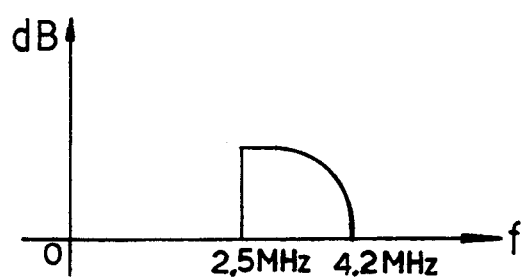
Figure 3C:
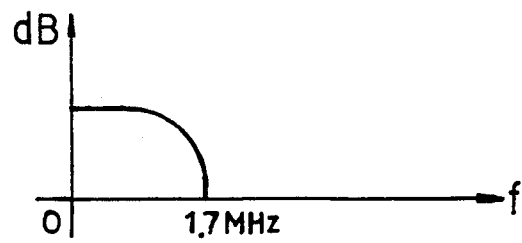

The high pass filter 21 of the high band signal recording circuit 20 passes only signals having a frequency band greater than a predetermined frequency (in the present invention, over 2.5 MHZ) as illustrated in FIG. 3B among the luminance signals Y shown in FIG. 3A output from the luminance/chrominance signal separator 10. The frequency translation circuit 22 translates the luminance signal having a frequency band of over 2.5 MHZ as illustrated in FIG. 3B to the low frequency band (0–1.7 MHZ) as illustrated in FIG. 3C in order to satisfy a recording characteristic of the recording medium. The ADC 23 converts the output of the frequency translation circuit to a digital signal to thereafter output the same. The video compressing processor 24 data-compresses the digitalized signal outputted from the ADC 23 in order to lower the frequency to consequently deeply record the same on the recording medium. Here, the data compression is performed by a well-known Motion Picture Experts Groups (MPEG) method or other methods.

Figure 4:
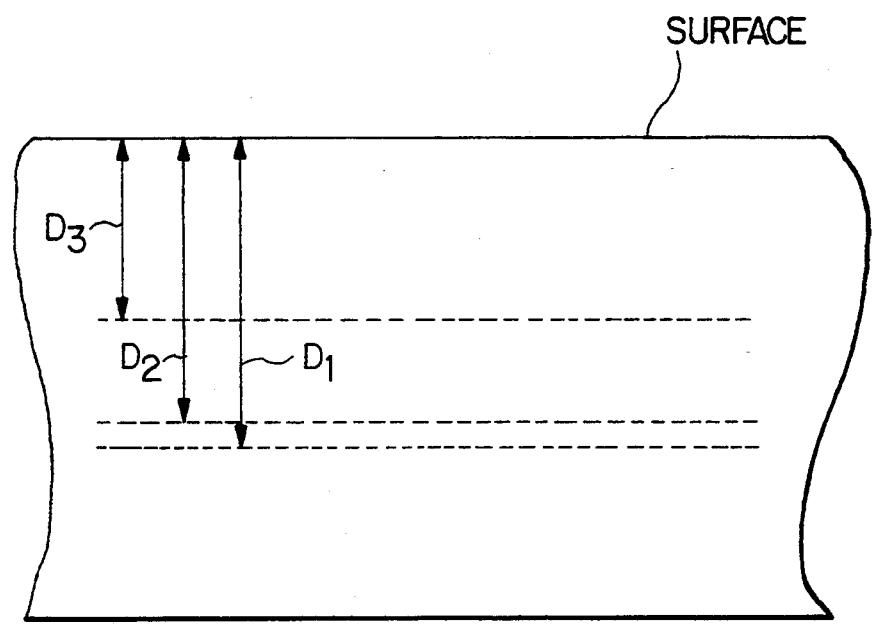
FIG. 4 is an illustration of a cross section of a magnetic recording medium which is useful in understanding the present invention.

In other words, in order to deeply record the high band component YHO of the luminance signal it is necessary to lower the frequency band further so that it is lower than the 0–1.7 MHZ band existing at the output of A-D converter 23. In fact, the recording frequency is made lower than that of an audio frequency A (which is usually 1.7 MHZ). Therefore, the recording depth $D_1$ of the high band component YHO of the luminance signal is greater than the recording depth De of an audio signal A. For example, a normal recording depth $D_2$ of an audio signal is approximately 0.85 μm and a normal recording depth of a video signal $D_3$ is approximately 0.43 μm. However, in the present invention, the recording depth $D_1$ of the high band component YHO of the luminance signal is, for example, greater than 0.85 μm. The exact values, of course, depend upon the head material and the recording medium material, but the numerical example above gives the relative values of the recording depths according to the invention see FIG. 4.

Here, the well-known MPEG method analyses the inputted video signal statistically to thereby detect a density, and a component having the greatest density is given a shortest code length while a component having the least density is given a longest code length.

Meanwhile, the memory 25 stores the signals output from the video compressing processor 24. The storing of the signals is designed to compensate for a time difference existing between the low frequency band and the high frequency band signals. The time difference exists because the circuits 22, 23 and 24 delay the high band signal as compared to the low band signal. In other words, the high frequency band signal is recorded one channel (one field) later than the low frequency band signal.

For instance, the low frequency band signal YL0 and high frequency band signal YH0 exist at the recording time T0, and when it is assumed that a low frequency band signal YL1 and a high frequency band signal YH1 exist, only a low frequency band signal YL0 is recorded on a first track, and the low frequency band signal YL1 is recorded on a second track while the high frequency band signal YH0 is compensated for the time difference in order to be deeply recorded.

As noted above, low frequency band signals YL2, YL3 . . . and high frequency band signals YH1, YH2 . . . are recorded on a third, fourth . . . and nth track.

The system controller 50 controls the memory 25 so that the luminance signal can be recorded on the recording medium using the horizontal/vertical synchronizing signals separated from the composite video signal by the synchronizing signal separator 40 and a head switching pulse HSP inputted from a drum servo (not shown).

As a 2-head method is used in the preferred embodiment, the controller 50 controls the recording mode and reproducing mode of the memory 25 in a period of 180 degrees.

QPSK modulator 26 is designed to perform a digital modulation, and digitally modulates the frequency of digitalized signals outputted from the memory 25 utilizing 4 phase values to thereafter output the same in analog form. The recording amplifier 27 amplifies the signal outputted from the QPSK modulator 26, so that the signal can be recorded on the recording medium through the first head 1.

The first head 1 has an adjusted gap, so that the deep recording operation mentioned above can be made on the recording medium, that is, the first video head has a longer gap than the conventional video head.

Therefore, the video data (high band luminance data) recorded through the first head is recorded on a deeper magnetic layer than that of an audio signal.

Meanwhile, the lower pass filter 31 of the low band signal recording circuit 30 passes and outputs only signals lower than 2.5 MHZ from the luminance signals Y separated by the luminance/chrominance signal separator 10. Frequency modulator 32 is a well-known modulating system and modulates frequencies in response to amplitudes of the inputted video signals. The second recording amplifier 33 amplifies the signals modulated from the frequency modulator 32, so that the signals can be recorded on the recording medium.

The second head 2 records the signals amplified from the second recording amplifier on the recording medium. The recording depth of this low band luminance data is not as deep as the high band luminance data is. Instead, a normal video signal recording depth (approximately 0.43 mm) is used. The second head 2 has the same gap as used by a conventional video head.

FIG. 2 shows a block diagram of the video signal reproducing apparatus which reproduces signals recorded by the recording apparatus shown in FIG. 1, and third and fourth heads 3 and 4 are the same as the first and second heads 1 and 2, respectively.

Conventionally, the heads are switched by head switching signals to thereby be used for recording and reproducing, however, in the present invention, for convenience sake, an explanation is given on the recording and reproducing processes separately.

The third head 3 reproduces high band luminance signals which were deeply recorded on the recording medium. The pre-amplifier 61 of the high band signal reproducing circuit 60 amplifies signals reproduced from the third head 3 to thereafter output the same. The band pass filter 62 passes only the signal having a predetermined band among the signals which have been amplified at the pre-amplifier 61 to thereby remove various noise signals.

QPSK demodulator 63 digitally demodulates the signals outputted from the band pass filter 62. In other words, the signals are restored to their form prior to modulation at QPSK modulator 26 in FIG. 1. The video restoring processor 64 restores the compressed data outputted from the QPSK demodulator 63 to the signals prior to being compressed by the circuit 24 in FIG. 1. The frequency translation circuit 65 restores the frequency band of the signals output from the video restoring processor 64 to their original condition before having frequency translated by circuit 22 of FIG. 1. In other words, high band signals as illustrated in FIG. 3C which were translated to below 2.5 MHZ during the recording is translated to the original frequency band as shown in FIG. 3B.

The fourth head 4 reproduces the low band luminance signals recorded on the recording medium. It is noted that these signals have not been deeply recorded as the high band luminance signals have. The pre-amplifier 71 of the low band signal reproducing circuit 70 amplifies the signals reproduced from the fourth head 4 to thereafter output the same. Frequency demodulator 72 frequency-demodulates the signals amplified by the pre-amplifier 71. ADC 73 digitalizes the signals demodulated from the frequency demodulator 72 to thereafter output the same. The mixer 80 mixes the signals outputted from the high band signal reproducing circuit 60 and low band signal reproducing circuit 70 to thereafter output the same. Here, the mixer 80 uses an adder circuit.

A Digital-to-Analog Converter (DAC) 90 converts the signals outputted from the mixer 80 to analog signals, to thereby output the same.

As seen in the foregoing, the video signal recording and reproducing apparatus in accordance with the present invention achieves an effect of improving the resolution by deeply recording and reproducing the high band video signals. Specifically, the high band video signals are recorded even more deeply than audio signals.

Though the foregoing description of the preferred embodiment has been presented for the purpose of illustration and description, many modifications and variations are possible in light of the above teaching without departing from the spirit and scope of the present invention.

Specifically, even though the above explanation has described only the video signals, it is not intended to limit the scope of this invention.

Furthermore, though the present invention has performed an in-depth recording by classifying the signals of above 2.5 MHZ as high bands, it is apparent that the present invention can be changed according to the head gap and magnetic characteristic of the recording medium.

What is claimed is:

1. A video signal recording apparatus, the apparatus comprising:

high band signal recording means for deeply recording a high band component signal separated from a composite video signal onto a recording medium using a first recording depth; and low band signal recording means for recording a low band component signal separated from said composite video signal onto said recording medium using a second recording depth much shallower than said first recording depth, wherein the high band signal recording means comprises:

a high pass filter for passing the high band component among luminance signals separated from the composite video signals;

frequency translation means for translating the high band component signal outputted from the high pass filter to a low frequency band;

an Analog-to-Digital Converter for converting the signal outputted from the frequency translation means to a digital signal;

a video compressing processor for compressing the luminance signal data of the high band component signal outputted from the Analog-to-Digital Converter;

memory means for storing the luminance signal data compressed by the video compressing processor;

Quadurature Phase Shift Keying modulator for modulating the luminance signal data stored in the memory means and outputted under a control of a system controller;

a recording amplifier for amplifying the luminance signal data outputted from the Quadurature Phase Shift Keying modulator; and a head for recording deeply the luminance signal data outputted from the recording amplifier onto a recording medium.

2. A video signal reproducing apparatus, the apparatus comprising:

high band signal reproducing means for reproducing a high band component of video signals which were deeply recorded onto a recording medium using a first recording depth; and low band signal reproducing means for reproducing a low band signal component of signals which were recorded onto the recording medium using a second recording depth much shallower than said first recording depth, wherein the high band signal reproducing means comprises:

a first reproducing head for reproducing a luminance signal of a high frequency band deeply recorded onto the recording medium;

a pre-amplifier for amplifying to a predetermined value the signal outputted from the first reproducing head;

a band pass filter for removing various noise signals by passing only a predetermined band of signals among the signals amplified by the pre-amplifier;

a Quadurature Phase Shift Keying demodulator for demodulating the signal outputted from the band pass filter;

a video restoring processor for restoring the signal outputted from the Quadurature Phase Shift Keying demodulator to a signal prior to having been compressed during a recording processing; and frequency translation means for translating to an original frequency band the signal outputted from the video restoring processor.

* * * * *